United States Patent
Shimada et al.

[11] Patent Number: 6,167,010
[45] Date of Patent: Dec. 26, 2000

[54] DISK REPRODUCTION APPARATUS AND TRACKING SERVO CIRCUIT

[75] Inventors: Hiroshi Shimada, Kamakura; Keisuke Kanda, Yokohama, both of Japan

[73] Assignee: Kabushiki Kaisha Toshiba, Kawasaki, Japan

[21] Appl. No.: 09/186,463

[22] Filed: Nov. 5, 1998

[30] Foreign Application Priority Data

Nov. 14, 1997 [JP] Japan .................................. 9-329668

[51] Int. Cl.[7] .......................................... G11B 7/00
[52] U.S. Cl. ............................ 369/44.35; 369/44.29; 369/44.32
[58] Field of Search ............... 369/44.27, 44.28, 369/44.29, 44.32, 44.34, 44.35, 44.36, 54, 124.02, 124.12

[56] References Cited

U.S. PATENT DOCUMENTS

| | | | |
|---|---|---|---|
| 5,050,149 | 9/1991 | Ishii et al. | 369/44.29 X |
| 5,142,518 | 8/1992 | Hangai et al. | 369/44.29 X |

FOREIGN PATENT DOCUMENTS 2-98881  4/1990  Japan .

*Primary Examiner*—Paul W. Huber
*Attorney, Agent, or Firm*—Oblon, Spivak, McClelland, Maier & Neustadt, P.C.

[57] ABSTRACT

In a disk reproduction apparatus, data recorded on a disk is read and converted into an electrical signal by a pickup, thereby generating a tracking error signal. The tracking error signal is converted into a digital signal by an A/D converter. The digital signal is converted into an analog signal by a D/A converter via a tracking digital equalizer. This analog signal drives a driver. An output from the driver drives the actuator of the pickup. The tracking digital equalizer selects the first mode of preferentially increasing the resolution of output data from the tracking servo circuit or the second mode of preferentially preventing an overflow of the output data. The equalizer processes the digital data from the A/D converter. An analog gain switching circuit is connected between the tracking digital equalizer and the driver to switch between the different gains set in accordance with the mode selected by the tracking digital equalizer.

20 Claims, 8 Drawing Sheets

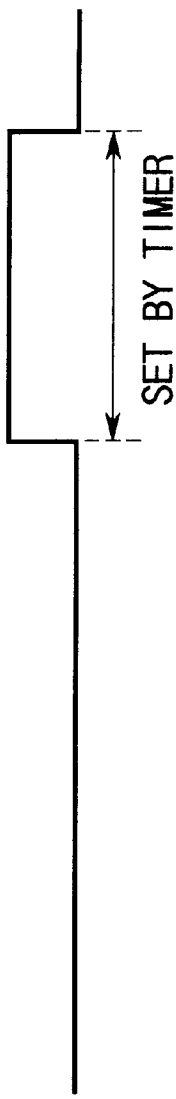
FIG. 9A  SEARCH (SRCH)
FIG. 9B  TRACKING ERROR (TE)
FIG. 9C  DEQ OUTPUT
FIG. 9D  GAIN SWITCHING SIGNAL     SET BY TIMER

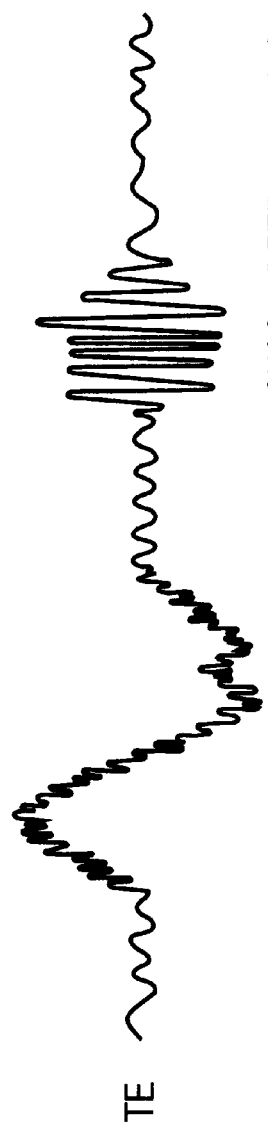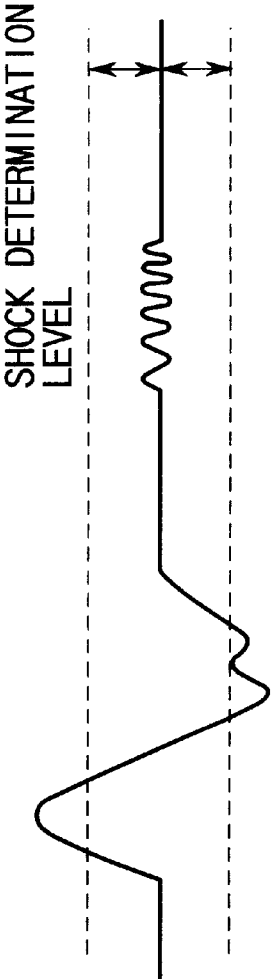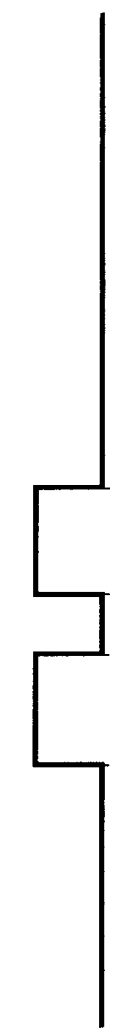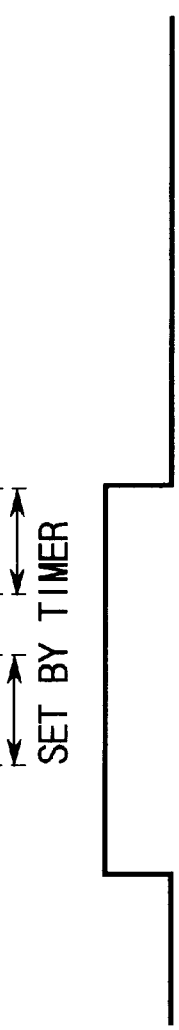
FIG. 10A TE
FIG. 10B TE VIA LPF
FIG. 10C SHOCK DETERMINATION SIGNAL
FIG. 10D DELAY TIMER SIGNAL
FIG. 10E GAIN SWITCHING SIGNAL

DISK REPRODUCTION APPARATUS AND TRACKING SERVO CIRCUIT

BACKGROUND OF THE INVENTION

The present invention relates to a disk reproduction apparatus and, more particularly, to an improvement in a tracking servo circuit used in a disk reproduction apparatus.

In a digital recording/reproduction system presently known in the field of audio equipment, an audio signal is converted into a digital signal by the PCM (Pulse Coded Modulation) technique, the digital signal is recorded on a recording medium such as a disk or magnetic tape, and the recorded digital signal is reproduced.

CDs in which bit arrays corresponding to digital data are formed on a 12-cm diameter disk and optically read are most popular. In a disk reproduction apparatus, an optical pickup incorporating a semiconductor laser and photoelectric conversion element is linearly moved from the outer to inner peripheral side of the disk, and the same time the CD is rotated at a CLV (Constant Linear Velocity) to read data recorded on the CD. A CD-ROM and DVD-ROM are known in addition to the CD.

FIG. 1 is a block diagram of a conventional disk reproduction apparatus. A disk 11 is driven by a disk motor 9 at the CLV. Data recorded on the disk 11 is read by an optical pickup (PU) 1 and supplied to an RF circuit 12.

The RF circuit 12 extracts focus and tracking error signals from an output from the optical pickup 1 and supplies them to a servo control circuit 10. At the same time, the RF circuit 12 binarizes the reproduced signal and supplies the resultant signal to a PLL circuit 13 as an EFM signal.

The PLL circuit 13 generates a PLL clock (VCOCK) serving as a EFM-synchronized reproduction clock for reading the EFM signal. The center frequency of the clock (VCOCK) is 17.2872 MHz four times the bit rate (4.3218 MHz) of the EFM signal. The PLL circuit 13 supplies the EFM signal and the PLL clock (VCOCK) to a signal processing circuit 14. The signal processing circuit 14 performs EFM demodulation, subcode demodulation, error correction processing, and the like. An output from the signal processing circuit 14 is supplied as digital data to a ROM and a DAC (Digital-to-Analog Converter) 16. An output from the DAC 16 is output as reproduced audio output through a low-pass filter (LPF) 17.

The EFM demodulation circuit in the signal processing circuit 14 generates a PLL frame clock (PFS) from the clock VCOCK and supplies it to a memory (not shown) and a clock circuit 15.

A system controller 18 is controlled by a microprocessor (not shown) and supplies a reproduction rate control signal HS and a clock control signal SW to the clock circuit 15. In addition, the system controller 18 supplies, to the signal processing circuit 14 and the servo control circuit 10, system control signals representing control operations such as control of play, stop, and cue search, and muting ON/OFF control. A control signal SW is output as a high-level ("H") signal from the system controller 18 in reproducing so-called ROM data such as character codes and images to be reproduced at high speed. The signal SW is kept at low level ("L") for audio data because it must be read at a constant clock rate.

The microprocessor can detect the positions of ROM and audio data on the disk in advance by reading a TOC (Table of Contents) table at the inner periphery of the disk. In accessing ROM data recorded at a given position on the disk, the microprocessor outputs, to the system controller 18, control signals, i.e., the signal SW of "H" level and a signal for moving the pickup to the target position.

The clock circuit 15 generates a reference clock (MCK) for the signal processing circuit 14 on the basis of a clock (XCK) from a quartz oscillator or the PLL clock (VCOCK) from the PLL circuit 13 in accordance with the reproduction rate control signal (HS) and the clock control signal (SW). The signal processing circuit 14 frequency-divides the reference clock (MCK) by 2,304 to output a frame clock (MFS) for a signal processing system. The clock (XCK) supplied from the quartz oscillator to the clock circuit 15 is directly output as a reference clock (SCK) for the servo control circuit 10.

FIG. 2 is a block diagram showing a tracking servo circuit in the conventional disk reproduction apparatus.

The tracking servo circuit comprises an A/D converter 3, a tracking digital equalizer 4, and a D/A converter 5 and is formed into a chip 20 made of silicon or the like.

A signal read from the disk by the optical pickup 1 is supplied as a current signal to a head amplifier 2 and amplified and output as a tracking error signal TE of the voltage signal. The tracking error signal TE is converted into digital data by the A/D converter 3. The converted digital data signal is supplied to the tracking digital equalizer (DEQ) 4.

The tracking digital equalizer 4 has a gain for realizing necessary phase compensation processing and gain compensation processing. An output from the tracking digital equalizer 4 is output as a digital data signal having a finite bit length.

Output data from the tracking digital equalizer 4 is supplied to the D/A converter 5 and converted into an analog signal. This analog signal is supplied to a driver unit 6. The driver unit 6 is driven by this analog signal to drive the actuator of the optical pickup 1. The tracking servo circuit in the reproduction apparatus performs the above series of operations to so control as to stably read a signal from the disk.

Two different characteristics are set in the tracking digital equalizer 4. In disk reproduction, the tracking digital equalizer 4 uses normal mode characteristics in normal play (i.e., a small offset from the center of servo). When the deviation from the center of servo is large in track catching at the end of search, upon reception of shock, and the like, gain-up mode characteristics for increasing the gain as compared with the normal mode characteristics are used. In this manner, the tracking digital equalizer 4 operates while switching the modes. The "deviation from the center of servo" is defined as a deviation from an electrical reference level corresponding to the position of data to be recorded on a track. The "search" means moving the head from a given track position to a target position (track).

Since the gain is normally set relatively low in the normal mode characteristics, an operation error rarely occurs even in the presence of a scratch on the disk. However, when the deviation from the center of servo is large in track catching at the end of search, upon reception of shock, and the like, convergence of tracking servo degrades. Since the gain is set relatively high in the gain-up mode characteristics, convergence of tracking servo is excellent even when the deviation from the center of servo is large in track catching at the end of search, upon reception of shock, and the like. However, an operation error readily occurs due to a scratch on the disk in the gain-up mode characteristics. Therefore, conventionally, the two different characteristics are selectively used.

FIG. 3 shows the waveform of the tracking error signal TE actually output from the head amplifier 2. This indicates the normal play state (the deviation from the center of servo is small), and the state in which the deviation from the center of servo is large in track catching at the end of search, upon reception of shock, and the like.

The maximum amplitude of the tracking error signal TE output from the conventional head amplifier 2, which is obtained when the recorded data position greatly deviates from the center of servo in track catching at the end of search, upon reception of shock, and the like, is set not to exceed a preset A/D (Analog/Digital) range.

The tracking error signal TE obtained when the recorded data position greatly deviates from the center of servo in track catching at the end of search, upon reception of shock, and the like is converted into digital data by the A/D converter 3. This digital data is input to the tracking digital equalizer 4 and output from the tracking digital equalizer 4 as digital data effectively using a finite bit length.

The tracking error signal TE in the normal play mode represents a small positional deviation of data recorded on a track from the center of servo. This tracking error signal TE has a small amplitude. Upon A/D conversion, the tracking digital equalizer 4 outputs a signal using only the lower bits of the finite bit length, i.e., an output signal having poor accuracy. Hence, during the play, the reproduction performance of the disk may suffer.

The characteristics of the tracking digital equalizer 4 at this time are generally as shown in FIG. 4. The gain in the intermediate frequency range is low. In particular, when the disk has a scratch, the signal in the intermediate frequency range leads to data loss in the arithmetic processing operation in the tracking digital equalizer 4. The reproduction performance may degrade due to the scratch of the disk.

To the contrary, in the normal play mode (the deviation from the center of servo is small) in which the gain of the tracking digital equalizer 4 is set higher than the conventional gain and the gain of the driver unit 6 is decreased to optimize the gain of the overall control system, loss of lower bit data can be prevented in the arithmetic processing operation in the tracking digital equalizer 4, thereby improving the reproduction performance.

A tracking error signal obtained when the deviation from the center of servo is large, e.g., when the optical pickup 1 catches recorded data on a track at the end of search in the above state or when a shock acts on the track, is A/D-converted. The resultant digital data is supplied to the tracking digital equalizer 4. At this time, since the tracking digital equalizer 4 uses the characteristics (gain-up mode gain) having a gain higher than that of the normal mode characteristics, an overflow occurs in the arithmetic processing operation, and the reproduction performance may deteriorate.

In the prior art, the reproduction performance in the normal play mode (the deviation from the center of servo is small) and the reproduction performance in the presence of a scratch of the disk are not good. Assume that the reproduction performance in the normal play mode (the deviation from the center of servo is small) and the reproduction performance in the presence of a scratch of the disk are improved. In this case, the tracking error signal TE obtained when the deviation from the center of servo is large in track catching at the end of search, upon reception of shock, and the like is A/D-converted. When the resultant digital data is supplied to the tracking digital equalizer 4, the reproduction performance suffers. It is, therefore, difficult to improve both the reproduction performance in the normal play mode and the reproduction performance achieved when the deviation from the center of servo is large in track catching at the end of search, upon reception of vibration and/or impact, and the like.

BRIEF SUMMARY OF THE INVENTION

The present invention has been made in consideration of the above situation, and has as its object to provide a disk reproduction apparatus and tracking servo circuit, which are capable of simultaneously improving the reproduction performance in the normal play mode (a deviation from the center of servo is small), the reproduction performance in the presence of a scratch on a disk, and the reproduction performance achieved when the deviation from the center of servo is large in track catching at the end of search, upon reception of shock, and the like.

In order to achieve the above object, a disk reproduction apparatus according to the present invention comprises:

a pickup having a photoelectric conversion element for optically reading data recorded on a disk and converting the data to an electric signal, and an actuator to be driven;

a circuit for receiving the electric signal from the photoelectric conversion element and generating a tracking error signal;

an analog-to-digital converter for receiving the tracking error signal from the circuit and converting the tracking error signal into digital data;

a tracking digital equalizer for selecting one of a first mode and a second mode and performing phase compensation and gain compensation which are required for a tracking servo circuit, the first mode being one for obtaining output data from the digital data supplied from the analog-to-digital converter, with a first gain, and the second mode being one for obtaining output data from the digital data supplied from the analog-to-digital converter, with a second gain smaller than the first gain;

a digital-to-analog converter for converting digital data supplied from the tracking digital equalizer into an analog signal;

a driver for receiving output data from the digital-to-analog converter and outputting a signal for driving the actuator of the pickup, thereby to form a feedback loop between input and output of the pickup; and a gain switching circuit connected to the tracking digital equalizer and the driver, for switching a gain in accordance with the mode selected by the tracking digital equalizer.

There is further provided a tracking servo circuit according to the present invention comprises:

an analog-to-digital converter for converting into digital data, a tracking error signal supplied from photoelectric conversion element for optically reading data recorded on a disk and converting the data into an electrical signal;

a tracking digital equalizer for selecting one of a first mode and a second mode and performing phase compensation and gain compensation which are required for the tracking servo circuit, the first mode being one for obtaining output data from the digital data supplied from the analog-to-digital converter, with a first gain, and the second mode being one for obtaining output data from the digital data supplied from the analog-to-digital converter, with a second gain smaller than the first gain;

a digital-to-analog converter for converting digital data supplied from the tracking digital equalizer into an analog signal and supplying output data thereof to a driver, the driver receiving output data from the digital-to-analog converter and outputting a signal for driving an actuator of a pickup, thereby to form a feedback loop between input and output of the pickup; and a gain switching circuit connected to the tracking digital equalizer for switching a gain in accordance with the mode selected by the tracking digital equalizer.

With the above arrangement, in the disk reproduction apparatus and tracking servo circuit of the present invention, the gains of the tracking digital equalizer and driver unit are synchronously switched by a gain switching signal from the analog gain switching circuit for switching the gain set by a mode selected by the tracking digital equalizer. Data loss in the arithmetic processing operation of the tracking digital equalizer in the normal play mode (the deviation from the center of servo is small), and a data overflow in the arithmetic processing operation of the tracking digital equalizer when the deviation from the center of servo is large (gain-up mode) in track catching at the end of search, upon reception of shock, the like can be prevented. The finite bit length can be effectively used from the tracking digital equalizer, a highly accurate output can be obtained, and the disk reproduction performance can be improved as compared with the conventional case.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 9A to 9D are timing charts of signal waveforms for explaining an operation of the tracking servo circuit of the present invention;

FIGS. 10A to 10E are timing charts of signal waveforms for explaining another operation of the tracking servo circuit of the present invention.

DETAILED DESCRIPTION OF THE INVENTION

The preferred embodiments of the present invention will be described with reference to the accompanying drawing.

A tracking servo circuit according to the first embodiment of the present invention will be described with reference to FIG. 5.

Figure 1:
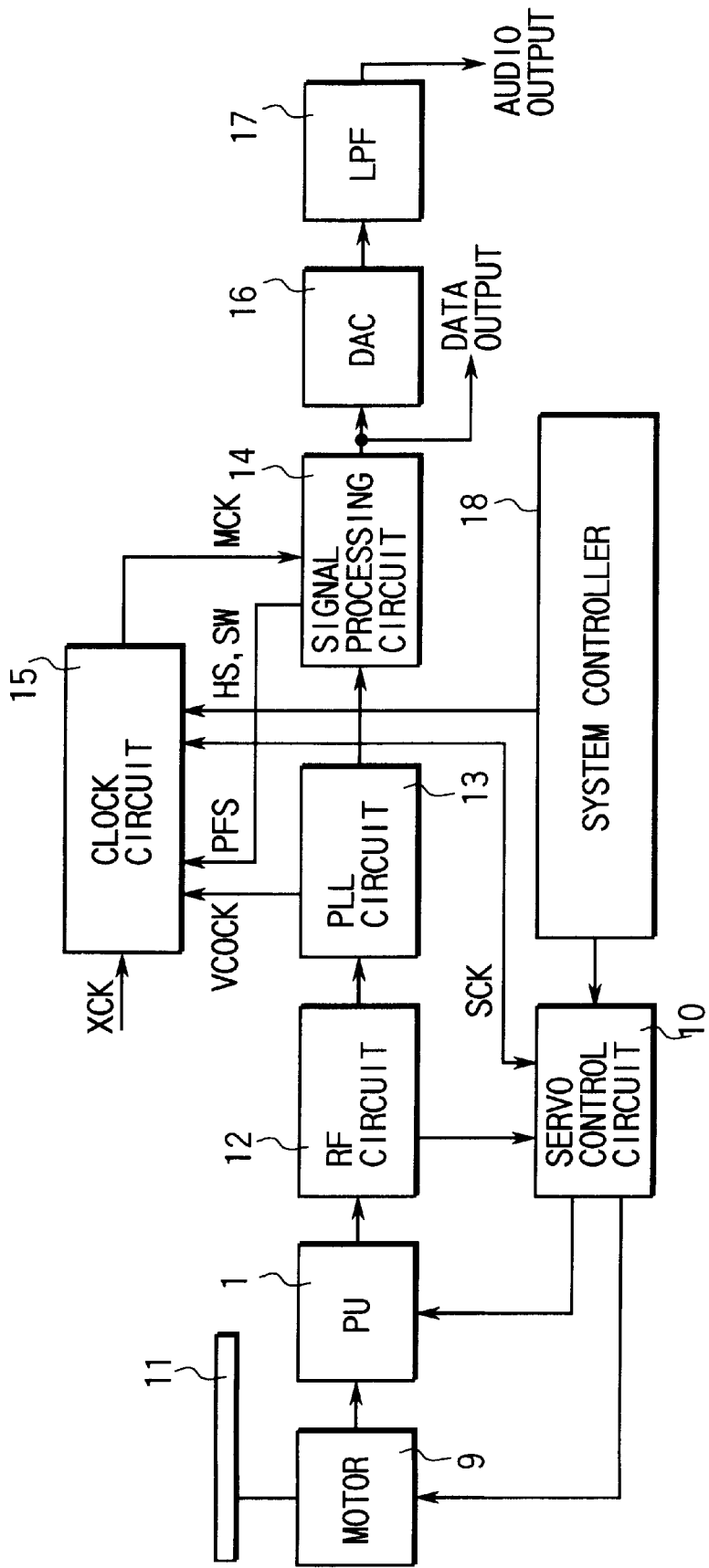
FIG. 1 is a block diagram showing the arrangement of a conventional disk reproduction apparatus.
Figure 2:
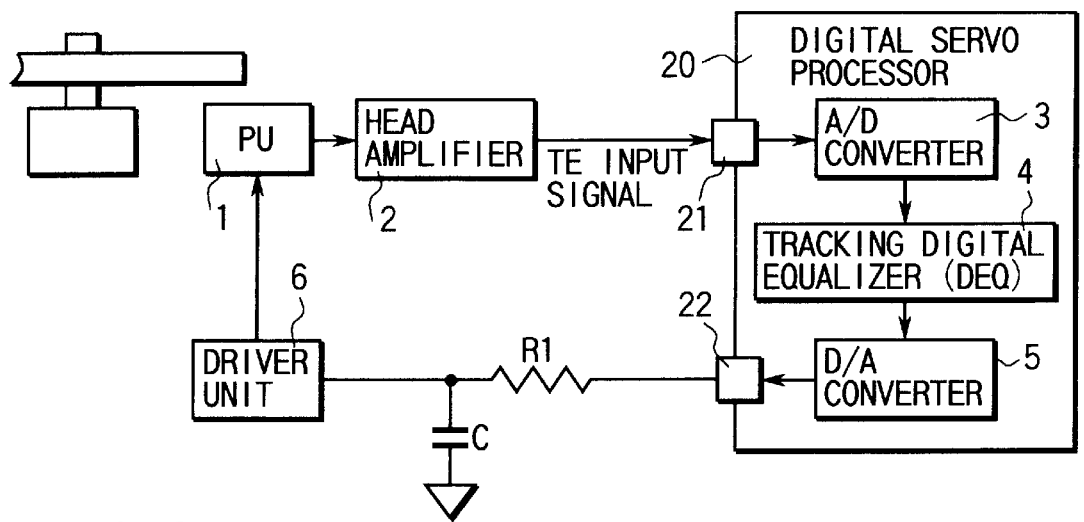
FIG. 2 is a block diagram showing the arrangement of a tracking servo circuit connected to a conventional optical pickup.
Figure 3:
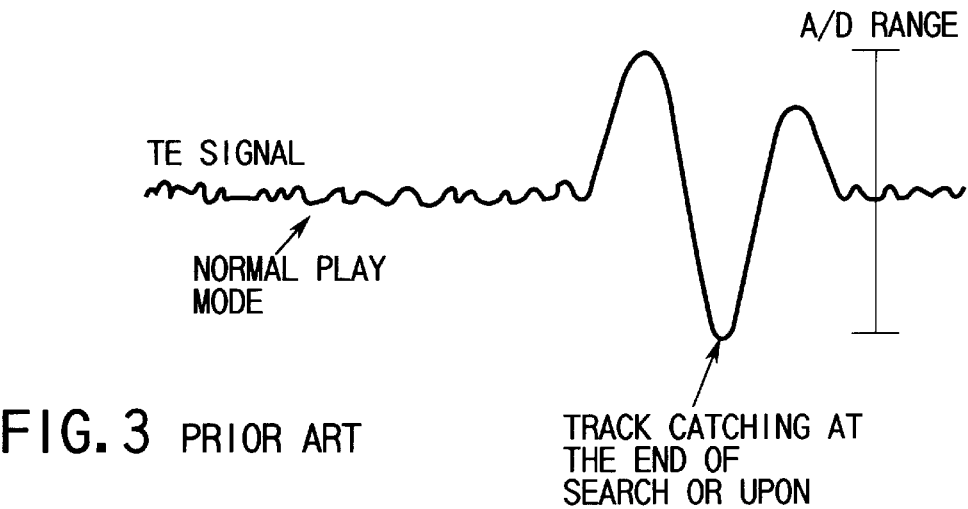
FIG. 3 is a waveform chart of a tracking error signal (TE) output from a head amplifier shown in FIG. 1.
Figure 4:
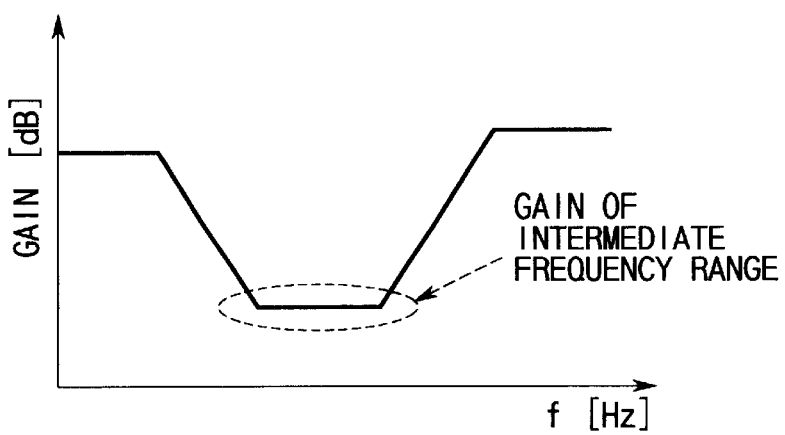
FIG. 4 is a graph of a tracking digital equalizer used in the present invention.

The tracking servo circuit is included in a servo control circuit 10 in the disk reproduction apparatus shown in FIG. 1. The tracking servo circuit comprises an A/D converter 3, a tracking digital equalizer (DEQ) 4, a D/A converter 5, and a gain switching signal control unit 7. The A/D converter 3, the tracking digital equalizer 4, and the D/A converter 5 are formed into a chip 20 made of silicon or the like.

A signal read from a disk 11 by an optical pickup 1 is supplied as a current signal to a head amplifier 2 and amplified and output as a tracking error signal TE. This tracking error signal TE is converted into digital signal by the A/D converter 3 in the chip 20 through a terminal 21. The converted digital signal is supplied to the tracking digital equalizer 4. The tracking digital equalizer 4 has gain characteristics for performing phase compensation processing and gain compensation processing which are required for tracking servo and outputs data having a finite bit length.

The output data from the tracking digital equalizer 4 is converted into an analog signal by the D/A converter 5. The analog signal is output outside the chip 20 from a terminal 22 and supplied to a driver unit 6. A resistor R1 is connected between the driver unit 6 and the terminal 22. One terminal of a capacitor C is connected between the resistor R1 and the driver unit 6, and the other terminal of the capacitor C is grounded.

The control unit 7 is connected to the driver unit 6 and the tracking digital equalizer 4 of the tracking servo circuit. The control unit 7 supplies a gain switching signal to the driver unit 6 and the tracking digital equalizer 4.

The driver unit 6 outputs the analog signal to drive the actuator of the optical pickup 1. By this series of operations, a signal can be stably read from the disk 11.

The tracking error signal TE in the normal play mode (the deviation from the center of servo is small) is converted into digital data by the A/D converter 3 and then supplied to the tracking digital equalizer 4. At this time, to prevent data loss in the arithmetic processing operation of the tracking digital equalizer 4, the gain switching signal for respectively setting the gains of the tracking digital equalizer 4 and driver unit 6 higher and lower than the conventional case is supplied from the control unit 7 to the tracking digital equalizer 4 and the driver unit 6.

In the above state, the tracking error signal TE obtained when the deviation from the center of servo is large in track catching at the end of search, upon reception of shock, and the like is converted into digital signal by the A/D converter 3. This digital signal is supplied to the tracking digital equalizer 4. In this case, the gain of the tracking digital equalizer 4 is set lower than the conventional gain to prevent a data overflow in the arithmetic processing operation of the tracking digital equalizer 4, although the gain is set high in the gain-up mode. The control unit 7 supplies a gain switching signal for increasing the gain of the driver unit 6 to the tracking digital equalizer 4 and the driver unit 6.

Consequently, the reproduction performance in the normal play mode (the deviation from the center of servo is small), the reproduction performance in the presence of a scratch on the disk, and the reproduction performance achieved when the deviation from the center of servo is large in track catching at the end of search, upon reception of shock, and the like can be simultaneously improved.

The disk reproduction apparatus according to the present invention can be obtained by applying a servo control circuit 10 shown in FIG. 1 to the tracking servo circuit having the above arrangement.

A tracking servo circuit according to the second embodiment of the present invention will be described with reference to FIGS. 6, 7A to 7C, and 8A to 8C.

Figure 6:
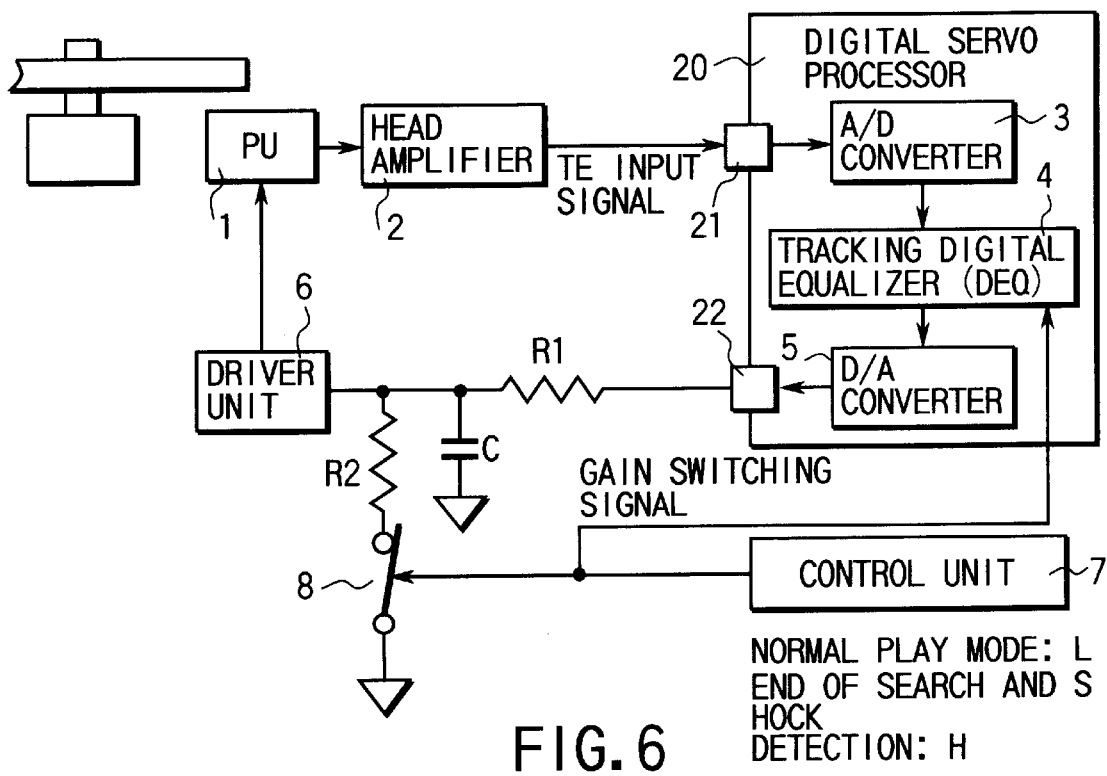
FIG. 6 is a block diagram of a tracking servo circuit according to another embodiment of the present invention.

A tracking servo circuit shown in FIG. 6 comprises an A/D converter 3, a tracking digital equalizer 4, a D/A converter 5, a driver unit 6, and a control unit 7 for switching and controlling the gain switching signal.

The A/D converter 3, the tracking digital equalizer 4, and the D/A converter 5 are formed into a chip 20 made of silicon or the like.

A signal read from a disk 11 by an optical pickup 1 is supplied as a current signal to a head amplifier 2 and amplified and output as a tracking error signal TE. This tracking error signal TE is converted into digital signal by the A/D converter 3 in the chip 20 through a terminal 21. The converted digital signal is supplied to the tracking digital equalizer 4. The tracking digital equalizer 4 has gain characteristics for performing phase compensation processing and gain compensation processing which are required for tracking servo and outputs data having a finite bit length.

The output data from the tracking digital equalizer 4 is converted into an analog signal by the D/A converter 5. The analog signal is output outside the chip 20 from a terminal 22 and supplied to a driver unit 6. A resistor R1 is connected between the driver unit 6 and the terminal 22. One terminal of a capacitor C is connected between the resistor R1 and the driver unit 6, and the other terminal of the capacitor C is grounded. A switch 8, one terminal of which is connected to a resistor R2 and the other terminal of which is grounded, is inserted between the capacitor C and the driver unit 6. The control unit 7 is added to the tracking servo circuit. The control unit 7 is connected to the switch 8 and supplies the gain switching signal to the tracking digital equalizer 4 in accordance with the ON/OFF operation of the switch 8. The driver unit 6 drives an optical pickup 1 by the output analog signal. By this series of operations, a signal can be stably read from the disk.

Figure 7A:
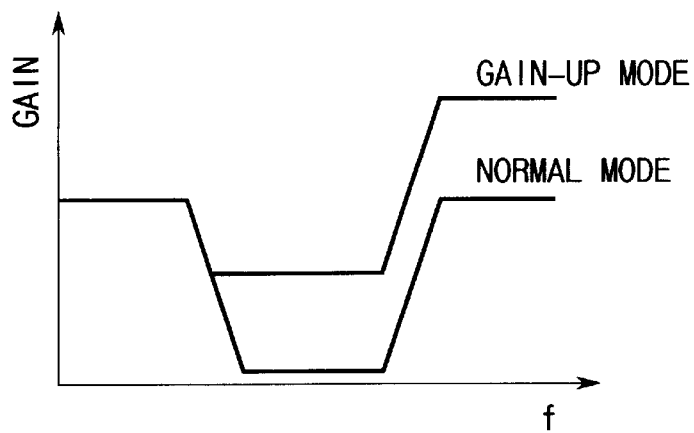
FIGS. 7A to 7C are graphs showing the characteristics of a conventional tracking digital equalizer, the characteristics of a driver unit, and the characteristics as a combination of these characteristics.
Figure 7B:
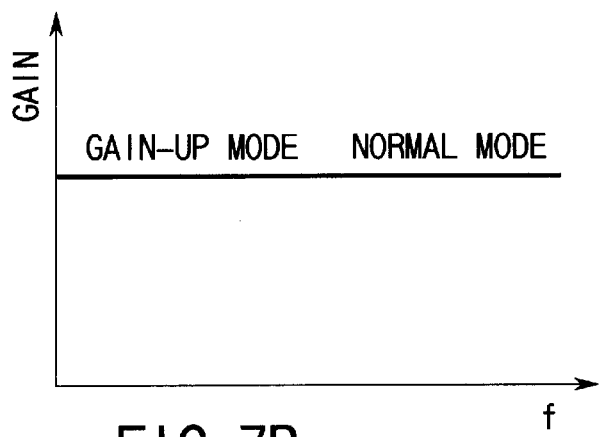
Figure 7C:
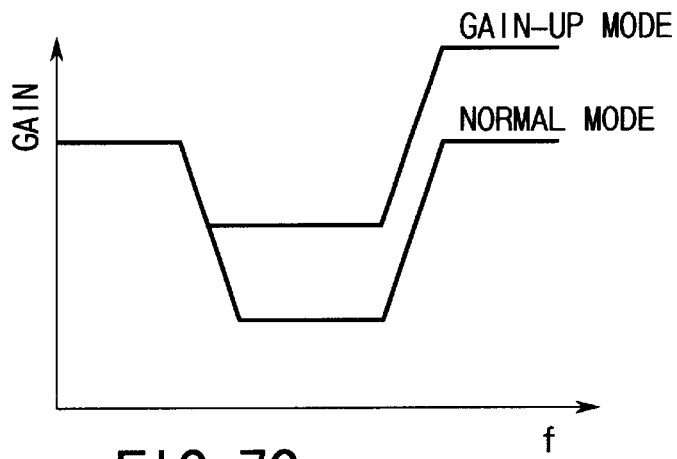
Figure 8A:
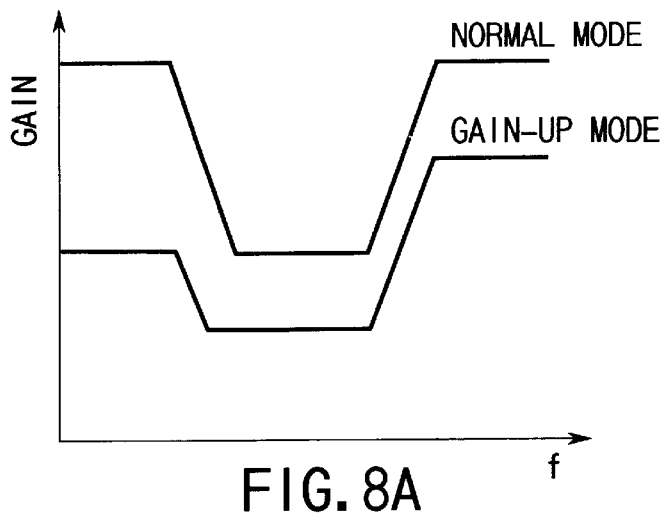
FIGS. 8A to 8C are graphs showing the characteristics of the tracking digital equalizer of the present invention, the characteristics of a driver unit, and the characteristics as a combination of these characteristics.
Figure 8B:
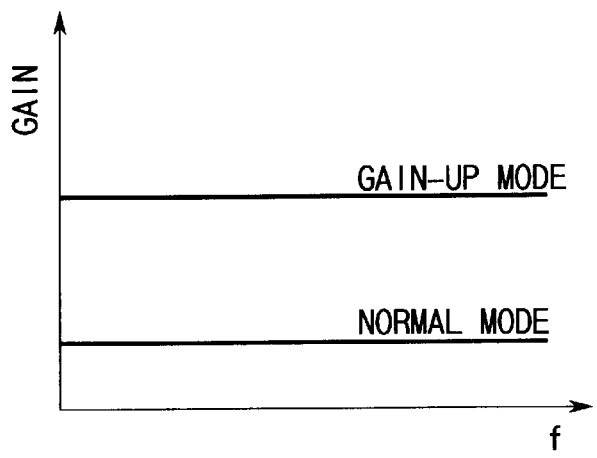
Figure 8C:
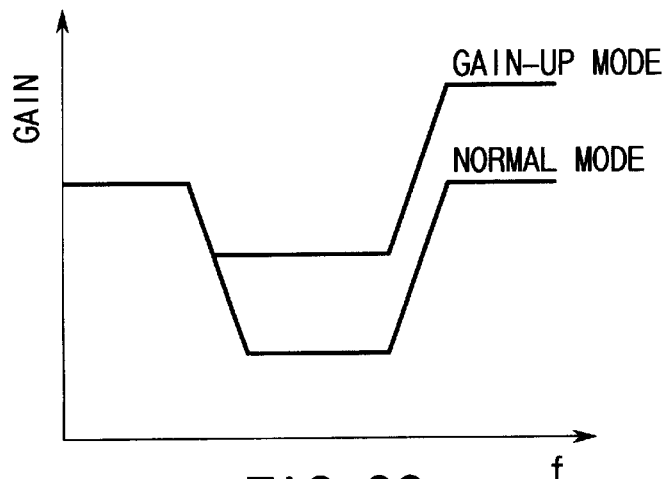

The characteristics of the tracking digital equalizer 4 and driver unit 6, and the characteristics as a combination of them shown in FIGS. 8A to 8C will be described below in comparison with the corresponding characteristics of the conventional case shown in FIGS. 7A to 7C.

When the tracking error signal TE obtained while the deviation from the center of servo is small (normal mode) is supplied to the tracking digital equalizer 4, data loss may occur in the arithmetic processing operation of the tracking digital equalizer 4.

The tracking servo circuit shown in FIG. 6 includes the switch 8 and the external resistor R2 for switching the gain of the driver unit 6. The gain switching signal from the control unit 7 is used to synchronously switch the gains of the tracking digital equalizer 4 and driver unit 6, thereby solving the conventional problem.

This circuit allows to supply an "L" gain switching signal from the control unit 7 to the tracking digital equalizer 4 and the switch 8 of the gain switching external resistor R2 when the deviation from the center of servo is small like in the normal play mode. The tracking digital equalizer 4 has characteristics as shown in FIG. 8A; it has a large gain. The switch 8 of the gain switching external resistor R2 is turned on so the driver unit 6 has characteristics as shown in FIG. 8B; it has a small gain. The characteristics as a combination of the characteristics of the tracking digital equalizer 4 and driver unit 6 are identical to those of the conventional case, as shown in FIG. 8C.

As described above, the output from the tracking digital equalizer 4 is increased to effectively use the finite bit length of the output, thereby increasing the accuracy. In particular, data loss can be prevented in the arithmetic processing operation of the tracking digital equalizer 4 in the intermediate signal frequency range which includes a scratch on a disk in the play mode. The reproduction performance of the disk in the normal play mode (the deviation from the center of servo is small) can be improved. In addition, the reproduction performance can be improved even in the presence of a scratch on the disk.

When the deviation from the center of servo is large in track catching at the end of search, upon reception of shock, and the like (gain-up mode), an "H" gain switching signal is supplied from the control unit 7 to the tracking digital equalizer 4 and the switch 8 of the gain switching external resistor R2. The tracking digital equalizer 4 has characteristics as shown in FIG. 8A; it has a small gain. The switch 8 of the gain switching external resistor R2 is turned off so the driver unit 6 has characteristics as shown in FIG. 8B; it has a large gain. The characteristics as a combination of the characteristics of the tracking digital equalizer 4 and driver unit 6 are identical to those of the conventional case, as shown in FIG. 8C.

As described above, reproduction performance identical to the conventional one is obtained. In addition, the output from the tracking digital equalizer 4 is increased in the normal play mode to increase the accuracy by effectively using the finite bit length of the output. The reproduction performance can be improved even in the presence of a scratch on the disk.

The control unit for outputting the gain switching signal will be described in more detail with reference to FIGS. 9A to 9D and 10A to 10E.

In tracking servo, when the head stably traces tracks, the tracking error signal TE has a small amplitude near the center of servo. However, the tracking error signal TE has a large amplitude greatly deviating from the center of servo (1) in track catching at the end of search (a transient state from the servo-off state to the servo-on state) and (2) upon reception of external shock (vibration) (FIG. 10A).

Figure 5:
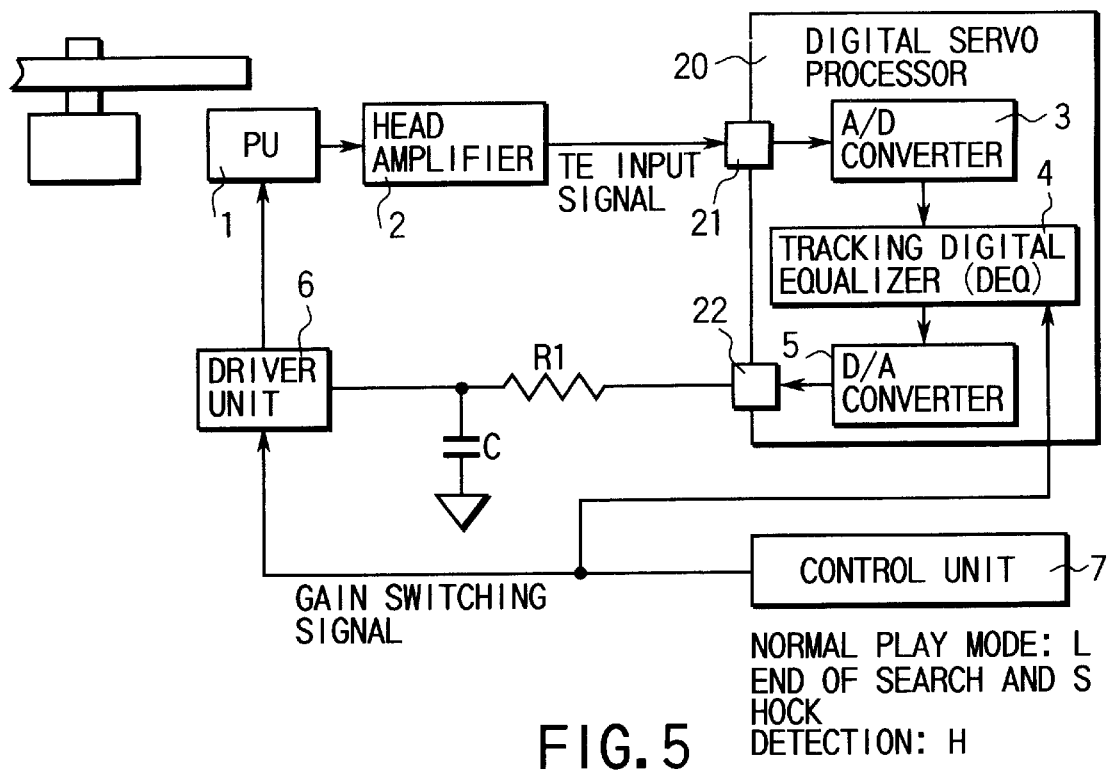
FIG. 5 is a block diagram of a tracking servo circuit according to the present invention.

Each of gain switching control units 7 shown in FIGS. 5 and 6 outputs a signal (gain switching signal) for switching the gain of the tracking digital equalizer and the gain of the driver unit when the servo system is set in one of the above two states. The gain switching signal is generated as follows.

(1) Track Catching at the End of Search

Search operation is started by an instruction from the system controller. At the end of search (FIG. 9A), the servo-off state, in which the feedback loop of the servo control system is disconnected, abruptly changes into the servo-on state. A tracking error signal may therefore temporarily deviate greatly from the center of servo until the servo-on state stabilizes (FIG. 9B). The output from the tracking digital equalizer (DEQ) also becomes transiently unstable (FIG. 9C). For this reason, for a predetermined period of time upon completion of search, the gain switching signal is forcibly set in a gain-up (H) state. The control unit 7 has a timer function of setting the above predetermined period of time. This period of time is set long enough to stabilize the servo (FIG. 9D).

(2) Reception of External Shock (Vibration)

Unlike the start of search initiated by the system controller, i.e., unlike track catching at the end of search, an external shock cannot be predicted. As a consequence, upon reception of an external shock, it must be detected, and the gain switching signal must be controlled. A tracking error signal itself is used in shock detection. The low-frequency component of the tracking error signal is detected by an LPF. If the level of the low-frequency component exceeds a preset shock detection level (FIG. 10B), the presence of a shock is determined (FIG. 10C).

Figure 11:
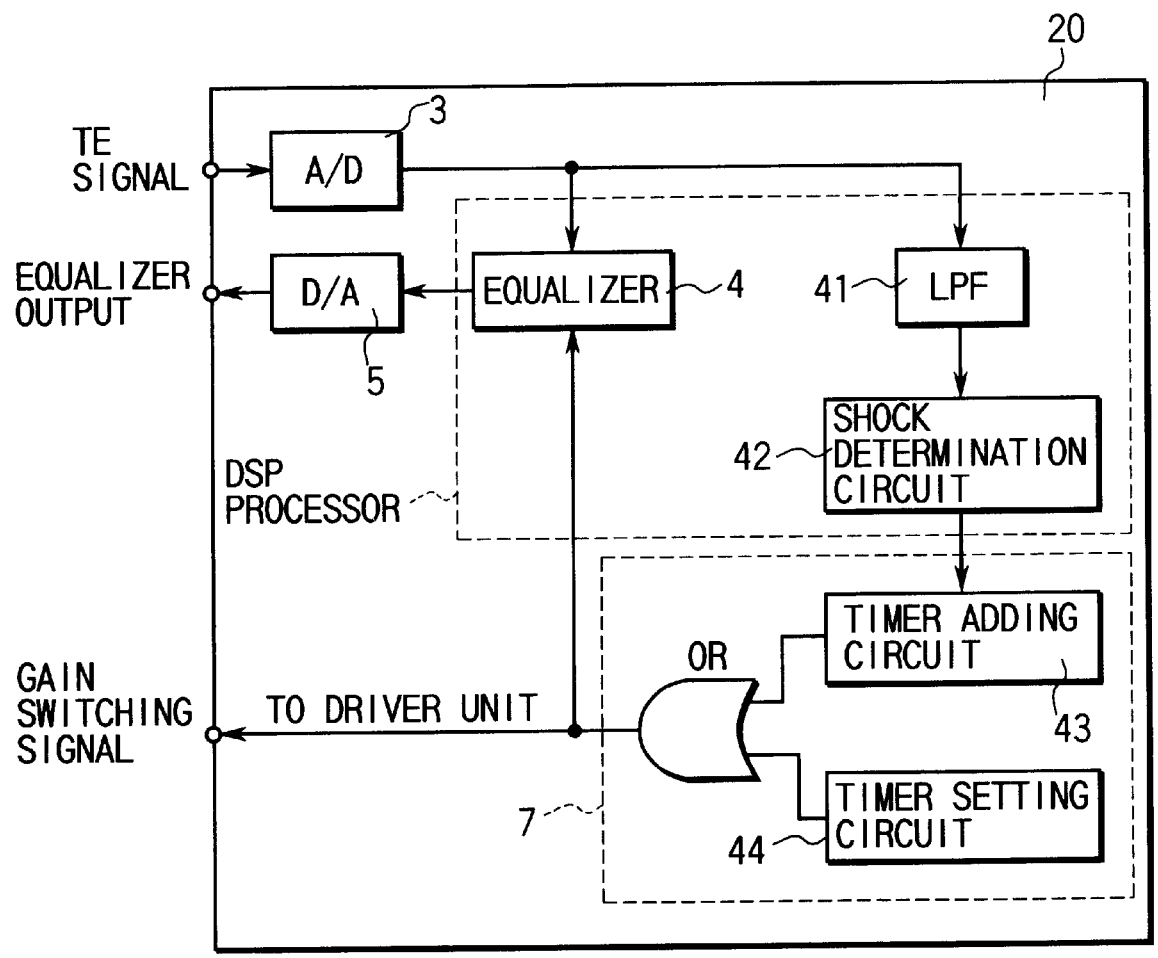
FIG. 11 is a block diagram of a tracking servo circuit according to still another embodiment of the present invention.

FIG. 11 shows the main part of a tracking servo circuit according to still another embodiment of the present invention.

The tracking servo circuit of this embodiment is included in a servo control circuit 10 in the disk reproduction apparatus shown in FIG. 1. The tracking servo circuit comprises an A/D converter 3, a tracking digital equalizer (DEQ) 4, a D/A converter 5, and a gain switching signal control unit 7, and is formed into a chip 20 made of silicon or the like. An output from the A/D converter 3 is input to a low-pass filter (LPF) 41. An output from the LPF 41 is input to a shock determination circuit 42. The shock determination circuit 42 outputs a shock determination signal. The shock determination signal is input to the control unit 7. The DEQ 4, the LPF 41, and the shock determination circuit 42 form a digital signal processor (DSP).

The control unit 7 comprises a timer adding circuit 43 for outputting the shock determination signal, a timer setting circuit 44 for outputting a delay timer signal, and an OR circuit 45 for receiving these two output signals.

A predetermined delay period upon shock determination is set, and this shock detection period and the following delay period are defined as a gain-up (H) period of the gain switching signal (FIGS. 10C and 10D).

The low-frequency component of the tracking error signal is used because the influence of a scratch on the disk appears in the high-frequency component of the tracking error signal. This allows differentiation of variations in tracking error signal by a scratch from those in tracking error signal by a shock.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for reproducing data from a disk, comprising:

a pickup having a photoelectric conversion element for optically reading data recorded on a disk and converting the data to an electric signal, and an actuator to be driven;

a circuit for receiving the electric signal from said photoelectric conversion element and generating a tracking error signal;

an analog-to-digital converter for receiving the tracking error signal from said circuit and converting the tracking error signal into digital data;

a tracking digital equalizer for selecting one of a first mode and a second mode and performing phase compensation and gain compensation which are required for a tracking servo circuit, said first mode being one for obtaining output data from the digital data supplied from said analog-to-digital converter, with a first gain, and said second mode being one for obtaining output data from the digital data supplied from said analog-to-digital converter, with a second gain smaller than the first gain;

a digital-to-analog converter for converting digital data supplied from the tracking digital equalizer into an analog signal;

a driver for receiving output data from the digital-to-analog converter and outputting a signal for driving the actuator of said pickup, thereby to form a feedback loop between input and output of said pickup; and a gain switching circuit connected to said tracking digital equalizer and said driver, for switching a gain in accordance with the mode selected by the tracking digital equalizer.

2. An apparatus according to claim 1, wherein said first mode is one for preferentially increasing a resolution of a tracking servo circuit and setting the first gain for increasing an allowance for a change in the output data of said tracking servo circuit with respect to a bit length of the output data, and said second mode is one for preferentially preventing an overflow of the output data and setting the second gain when data having a greater change with respect to the bit length of input data is input.

3. An apparatus according to claim 1, wherein said first mode is selected during normal operation, and said second mode is selected in one of a condition that a track is caught during a tracking search operation and a condition that vibration and/or impact is applied externally.

4. An apparatus according to claim 1, wherein said gain switching circuit generates a gain switching signal for designating one of the first mode for increasing the gain of said tracking digital equalizer in accordance with a deviation of an electric signal waveform from a reference level, which corresponds to a deviation of data generated between a data position on the disk and a read position of said pickup from a reference position while decreasing a gain of said driver and the second mode for decreasing the gain of said tracking digital equalizer while increasing the gain of said driver.

5. An apparatus according to claim 4, wherein said gain switching circuit generates the gain switching signal in accordance with a signal for designating a tracking search operation.

6. An apparatus according to claim 5, wherein the signal for designating the tracking search operation is output from a system controller which controls the entire apparatus.

7. An apparatus according to claim 5, wherein said gain switching circuit includes a time counting circuit for measuring a predetermined period of time after the feedback loop is closed when the feedback loop is opened for the tracking search operation, a data read track is changed from a current data read track to another track and the feedback loop is closed again, to set said tracking servo circuit in the second mode during the predetermined period of time, and set said tracking servo circuit in the first mode after the predetermined period of time.

8. An apparatus according to claim 4, wherein said gain switching circuit generates the gain switching signal in accordance with a level of the tracking error signal, which has been detected.

9. An apparatus according to claim 8, further comprising a vibration and/or impact determining circuit connected between said analog-to-digital converter and said gain switching circuit, for setting said tracking servo circuit in said first mode when vibration and/or impact, applied externally, is not detected, and for setting said tracking servo circuit in the second mode when vibration and/or impact applied externally is detected.

10. An apparatus according to claim 9, further comprising a low-pass filter for extracting a low-frequency component of the tracking error signal and supplying the low-frequency component to said vibration and/or impact determining circuit.

11. A tracking servo circuit comprising:

an analog-to-digital converter for converting into digital data, a tracking error signal supplied from photoelectric conversion element for optically reading data recorded on a disk and converting the data into an electrical signal;

a tracking digital equalizer for selecting one of a first mode and a second mode and performing phase compensation and gain compensation which are required for said tracking servo circuit, said first mode being one for obtaining output data from the digital data supplied from said analog-to-digital converter, with a first gain, and said second mode being one for obtaining output data from the digital data supplied from said analog-to-digital converter, with a second gain smaller than the first gain;

a digital-to-analog converter for converting digital data supplied from the tracking digital equalizer into an analog signal and supplying output data thereof to a driver, said driver receiving output data from the digital-to-analog converter and outputting a signal for driving an actuator of a pickup, thereby to form a feedback loop between input and output of said pickup; and a gain switching circuit connected to said tracking digital equalizer for switching a gain in accordance with the mode selected by the tracking digital equalizer.

12. A circuit according to claim 11, wherein said first mode is one for preferentially increasing a resolution of said tracking servo circuit and setting the first gain for increasing an allowance for a change in the output data thereof with respect to a bit length of the output data, and said second mode is one for preferentially preventing an overflow of the output data and setting the second gain when data having a greater change with respect to the bit length of input data is input.

13. A circuit according to claim 11, wherein said first mode is selected during normal operation, and said second mode is selected in one of a condition that a track is caught during a tracking search operation and a condition that vibration and/or impact is applied externally.

14. A circuit according to claim 11, wherein said gain switching circuit generates a gain switching signal for designating one of the first mode for increasing the gain of said tracking digital equalizer in accordance with a deviation of an electric signal waveform from a reference level, which corresponds to a deviation of data generated between a data position on the disk and a read position of said pickup from a reference position while decreasing the gain of said driver and the second mode for decreasing the gain of said tracking digital equalizer while increasing the gain of said driver.

15. A circuit according to claim 14, wherein said gain switching circuit generates the gain switching signal in accordance with a signal for designating a tracking search operation.

16. A circuit according to claim 15, wherein the signal for designating the tracking search operation is output from a system controller which controls an entire apparatus.

17. A circuit according to claim 15, wherein said gain switching circuit includes a time counting circuit for measuring a predetermined period of time after the feedback loop is closed when the feedback loop is opened for the tracking search operation, a data read track is charged from a current data read track to another track and the feedback loop is closed again, to set said tracking servo circuit in the second mode during the predetermined period of time, and set said tracking servo circuit in the first mode after the predetermined period of time.

18. A circuit according to claim 14, wherein said gain switching circuit generates the gain switching signal in accordance with a level of the tracking error signal, which has been detected.

19. A circuit according to claim 18, further comprising a vibration and/or impact determining circuit connected between said analog-to-digital converter and said gain switching circuit, for setting said tracking servo circuit in said first mode when vibration and/or impact, applied externally, is not detected, and for setting said tracking servo circuit in the second mode when vibration and/or impact applied externally is detected.

20. A circuit according to claim 19, further comprising a low-pass filter for extracting a low-frequency component of the tracking error signal and supplying the low-frequency component to said vibration and/or impact determining circuit.

* * * * *